United States Patent [19]

Güntert

[11] 3,930,437

[45] Jan. 6, 1976

[54] PISTON STRUCTURE, PARTICULARLY FOR HYDRAULIC MACHINES

[75] Inventor: Karl Güntert, Oensingen, Switzerland

[73] Assignee: Von Roll AG, Gerlafingen, Switzerland

[22] Filed: Mar. 8, 1974

[21] Appl. No.: 449,286

[30] Foreign Application Priority Data

Mar. 20, 1973 Switzerland ........................ 4054/70

[52] U.S. Cl. ...................... 92/160; 91/488; 92/172; 92/187; 92/255; 403/379

[51] Int. Cl.² .......................... F16J 1/08; F16J 1/22

[58] Field of Search ............. 92/160, 181, 187, 216, 92/224, 255, 172; 403/379; 91/488, 499

[56] References Cited

UNITED STATES PATENTS

| | | | |
|---|---|---|---|
| 1,216,218 | 2/1917 | Eddowes | 403/379 X |
| 2,066,802 | 1/1937 | Rowntree et al. | 92/224 |
| 2,077,688 | 4/1937 | Gottlieb | 92/224 |
| 2,141,935 | 12/1938 | Rose | 91/488 |
| 2,974,636 | 3/1961 | Farmer | 92/255 X |
| 3,073,254 | 1/1963 | Hoover | 91/488 X |
| 3,172,340 | 3/1965 | Blenkle | 92/181 X |
| 3,173,376 | 3/1965 | Hulman et al. | 91/488 |
| 3,183,786 | 5/1965 | Defoe, Jr. | 92/169 X |
| 3,343,460 | 9/1967 | Jones | 92/168 |
| 3,474,710 | 10/1969 | Stryker | 92/164 X |

FOREIGN PATENTS OR APPLICATIONS

| | | | |
|---|---|---|---|
| 820,245 | 11/1951 | Germany | 92/181 |
| 551,362 | 2/1943 | United Kingdom | 92/181 |

*Primary Examiner*—Irwin C. Cohen
*Attorney, Agent, or Firm*—Flynn & Frishauf

[57] ABSTRACT

The piston is formed with a piston head and a sleeve, fitted together such that the piston head has an outer end diameter matching the diameter of the cylinder, and then is formed with an offset inwardly extending shoulder, against which the piston sleeve can bear, to permit machining of the inner face of the piston head to form a bearing cup for a spherical head of a piston rod, and then assembly of the piston sleeve to bear against the abutment; drain line and oil connection lines may be formed in the piston to lead lubricating oil to the bearing cup. The piston head and sleeve can be connected by adhesives and, if necessary, tangentially located transverse pins.

6 Claims, 2 Drawing Figures

PISTON STRUCTURE, PARTICULARLY FOR HYDRAULIC MACHINES

The present invention relates to a piston structure and more particularly to a piston structure for hydraulic machines, such as axial hydraulic machines, for example of the wobble plate type.

Hydraulic axial machines having a rotating drum which has an axis inclined with respect to the drive axis use pistons with comparatively long piston sleeves. A spherical bearing cup is formed in the interior of the piston head in which the spherical end of the piston rod is seated, to bear thereagainst. The other end of the piston rod may also be spherical, or at least part spherical, and bears in suitable spherical, or part spherical depressions of a drive flange connected to the drive shaft. The interior of the piston sleeve is so formed at the free end thereof that the piston rod may bear thereagainst, to carry along the rotating cylinder drum.

It has been customary to make the piston as a single element. This required, however, working the piston in such a manner that, at the interior thereof, a bearing cup has to be made which is recessed for a considerably distance from the outer end of the piston sleeve. If these pistons have any considerable dimension at all, it is difficult to reach the interior thereof with appropriate working tools, and thus the required accuracy of manufacture of the bearing cup could be maintained only with great difficulty, and frequently only by reworking after the bearing cup has been thermally treated, for example after hardening or nitriding thereof. It has been found from experience that, upon re-working of an already hardened bearing cup, the hard surface was removed to such an extent that the surface hardened portion was actually completely removed, thus interfering with free movement of the spherical head of the piston rod and free sliding thereof in the bearing cup, since the surface hardness was no longer uniform over the entire bearing cup surface. Thus, the piston rod no longer moved freely in all directions, even though the bearing cup itself was lubricated by oil under high pressure.

It has previously been tried to construct the piston in two parts, in order to eliminate the difficulty in manufacture of the piston with an interiorly located bearing cup. In one such construction, a piston head was made which also carried the bearing cup, into which a piston sleeve was screwed, and suitably retained. This arrangement had the disadvantage that the pressure of the hydraulic machine with which this piston was used acts on the end face of the piston and, further, on the ring surface of the piston sleeve. This pressure thus loads the threads which connect the piston head and the piston sleeve resulting in damage to the threads which, in comparatively short time, will loosen, requiring repair and down-time. The loading of the thread which connects the piston head with the piston sleeve is increased also by friction of the piston sleeve in the same direction as the pressure acting on the end of the ring surface of the piston sleeve. As a result, interconnecting a piston head and a piston sleeve by means of thread has not found wide acceptance; in modern high-pressure axial piston machines single, unitary pistons are used almost entirely in spite of the difficulty in manufacture thereof.

It is an object of the present invention to provide a piston for high-pressure fluid, particularly hydraulic fluid machines which is so constructed that the disadvantages of known two-part pistons are avoided, which results in a secure connection, without play, and which permits manufacture thereof without difficulty.

Subject matter of the present invention: Briefly, the piston is formed of a piston head and a piston sleeve. The piston head has a diameter which is matched to that of the cylinder, in which it is to operate. It is formed with a shoulder extending, for example, circumferentially around the piston head to form a ring-stepped portion, from which an inner portion projects in which the bearing cup is actually made. The shoulder, and the outer circumference of the inner projection (on which the bearing cup is formed) additionally form a seat and an abutment for the cylinder sleeve. The cylinder sleeve has the same outer diameter as the cylinder head, and is pushed on the cylindrical portion, of reduced diameter, of the cylinder head up to the shoulder abutment, and then connected thereto, for example by means of an adhesive and, if desired, additionally by tangentially extending pins. Oil ducts may be formed in the piston head, where desired, to provide for lubrication, and drainage of pressurized fluid to prevent separation of the piston head and sleeve.

The invention will be described by way of example with reference to the accompanying drawings, wherein.

Figure 1:
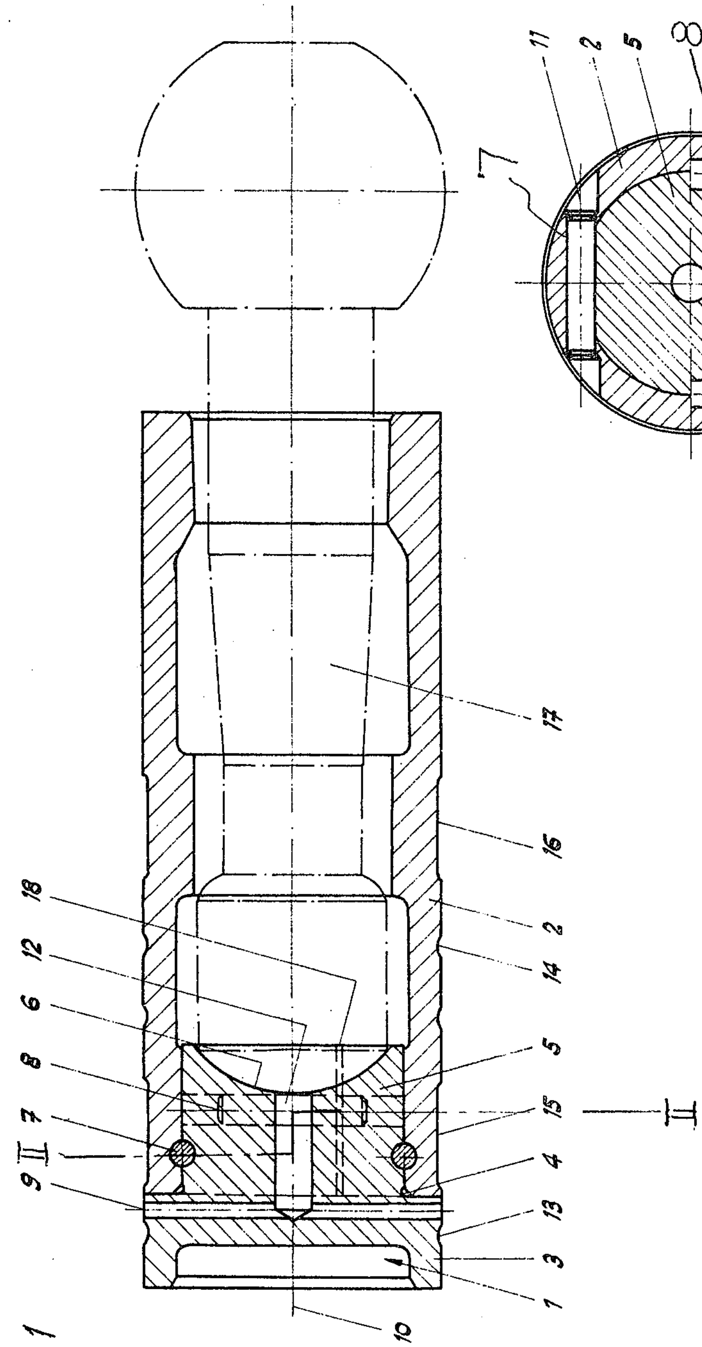
FIG. 1 is a longitudinal sectional view through a piston.

The piston has a piston head 1 and a piston sleeve 2. Piston head 1 has an end face 3, of the same diameter as the outer diameter of the piston sleeve 2. The diameter of the end face, and hence of the outer surface of the piston sleeve 2, is matched to that of the bore of the cylinder in which the piston is to operate; this fitting, or matching diameter may be defined to be the same as that of the cylinder, less such clearance as may be desired by the designer. The circumference of the end portion 3, as well as the circumference of the sleeve 2 is formed with grooves 13, 14, extending circumferentially around the piston. Sleeve 2 is further formed with recesses 15, 16. These grooves and recesses provide pressure equalization at the circumference of the piston if the piston is not exactly centered in the cylinder in which it is to operate, and further decreases the contact and engagement surfaces between piston and cylinder.

The end or face portion 3 of the cylinder head 1 is formed with an offset shoulder 4, extending circumferentially around the piston head. An inner end portion 5 then extends axially from the offset shoulder 4, the inner end portion 5 having a radius which is less than that of the face portion 3 by the wall thickness of the piston sleeve 2. Piston sleeve 2 is pushed over the inner portion 5 of the piston head 1, to form a tight, centered connection. The interconnection between the piston head 1 and the piston sleeve 2 can be further improved by adhesives which, additionally, prevent pressure fluid, such as oil, from penetrating into the junction between the end of sleeve 2 where it fits against the abutment shoulder 4. The piston head 1 and the cylindrical sleeve 2 are further connected by means of pins 7, 8. The pins 7, 8 have axes 11 which are tangential to the inner portion 5 of the cylinder head 1. Four pins 7, 8 are provided, offset in different planes from each other (see FIG. 1 and section line II). Other connections may be used, for example a thread formed on the seat itself, or between the inner portion 5 of the piston head and the sleeve 2, together with, or without adhesives. It is important, however, that the piston head 1 and the cylinder 2 have the same outer diameter, so that pressure fluid cannot act at the end face of the piston sleeve 2. The connection between piston sleeve 2 and the piston head 1, at the shoulder 4, should be tight.

The interior of the piston head 1 is formed with a bearing cup 6, against which the head of a piston rod 17 may bear. Piston rod 17 is not described further, and the interior of the piston sleeve 2 is also not further described since these features may be conventional and, in any event, have no bearing with respect to the inventive concept of the piston structure.

A radial bore 9 extends through, or at least to the center of the interior of the piston head 1, in the vicinity, but ahead of the shoulder 4. The radial bore 9 communicates with an axial bore 12, coinciding with the longitudinal axis 10 of the piston. Bore 12 connects the radial bore 9 to the interior of the bearing cup 6, and transmits pressure fluid, such as oil, which penetrates into the gap between the piston and the cylinder to the bearing cup 6. This oil may, also, be used for further lubrication of other friction surfaces located along the axis 10. A groove 18 is formed at the inner junction surface between the piston sleeve 2 and the piston head 1, that is, at the cylindrical inner extension 5, and extending from the abutment shoulder 4 to the interior of the piston. This groove, as well as the cross bore 9 communicating with bore 12 prevent pressurized fluid from accumulating circumferentially of the piston, and the build-up of pressure at the junction line between the piston head 1 and sleeve 2, at the abutment shoulder 4, which pressure may interfere with proper seating and connection between the sleeve 2 and head 1, and more particularly the inner portion 5 thereof. The connection between piston head 1 and sleeve 2 is thus placed under less stress, so that the connection need accept only the frictional forces of the sleeve 2 such inertia forces as may arise during operation of the machine.

The structure of the present invention has this important advantage: Pressure will not be exerted against the end of the piston sleeve 2. This is avoided by the shape of the piston head 1, and its diametrical size with respect to the diameter of the sleeve 2, the piston head 1 accepting the entire end pressure applied thereagainst by the pressure fluid. Connecting the piston head 1 and sleeve 2 by means of an adhesive, and further providing bore 9, 10, and groove 18 further decreases the danger that high pressure can build up in the connection between the piston head 1 and sleeve 2, even though the oil reaching this connection must pass through narrow clearance gaps, thus is already throttled.

The piston head 1 is first manufactured separately; the bearing cup 6 can be manufactured easily, and while the entire piston head 1 is accessible from all sides. The size, as well as the shape of the piston head, and of the bearing cup can thus be accurately formed and controlled. Re-working, after thermal treatment is simple, and the bearing cup can be tested and, if necessary, re-worked for surface quality, and surface hardness so that the overall surface of the bearing cup will be uniform and thus permit uniform movement of the piston rod 17, in any direction, with respect to the head 1. After manufacture, testing and, if necessary, reworking of the head, and the bearing cup surface 6, the head is assembled to sleeve 2 with, or without, an adhesive, the pins 7, 8 located and secured, for example by peening, some other deformation, by adhesives, or the like.

Various changes and modifications may be made within the scope of the inventive concept.

Figure 2:
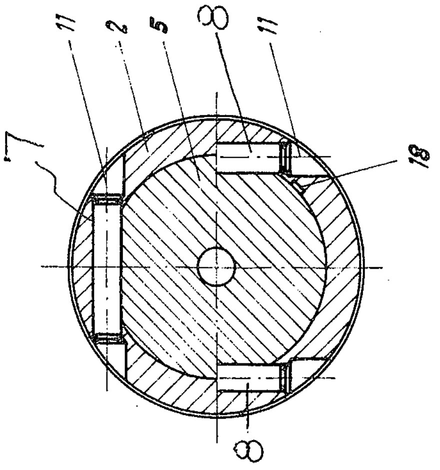
FIG. 2 is a transverse sectional view along the line II—II of FIG. 1.

The groove 18 may be formed in either the inner surface of the sleeve (FIG. 2), the outer surface of the inner portion 5 of the piston head 1, or in both the piston head 1, as well as the sleeve 2. More than one such groove may be provided.

I claim:

1. Hydraulic piston construction comprising
a piston head (1) having
a face end portion (3) which has a diameter fitting in the cylinder in which the piston is to operate;
an inner end portion (5) of reduced diameter, the junction of said portions forming an abutment shoulder (4), the inner end face of said inner portion (5) being formed as a bearing cup (6);
a piston sleeve (2) having an inner surface closely fitting around the outer surface of the inner end portion (5), seating against said abutment shoulder (4) and having an outer diameter equal to that of the face end portion (3) of the piston head (1) fitting in the cylinder in which the piston is to operate, the piston sleeve being internally hollow and surrounding the inner end portion (5) of reduced diameter of the piston head a plurality of transversely extending grooves formed in the outer surface of said inner end portion, a plurality of transversely extending grooves formed in the inner surface of said piston sleeve with each groove extending at, at least one end thereof, to the outer surface of said sleeve, said grooves of said inner end portion and said piston sleeve being aligned with one another;
and solid connecting pins (7, 8) engaged in said aligned grooves and extending transversely to the axis (10) of the piston connecting the piston head (1) to the piston sleeve, the pins being located such that the axes thereof are tangential to the circumference of the inner end portion (5) of the piston head.

2. Piston construction according to claim 1, including adhesive means connecting the piston head (1) and the piston sleeve (2) together.

3. Piston construction according to claim 1, further comprising a radial bore (9) formed only in the piston head (1) and extending from the circumference of the face end portion (3) radially inwardly;
and an axial bore (12) extending from the bearing cup (6) to said radial bore (9).

4. Piston construction according to claim 1, further comprising a fluid communication groove (18) formed in the interface between the outer surface of the inner end portion of the piston head (1) and the inner surface of the sleeve (2) and extending from the abutment shoulder (4) to the bearing cup (6) to provide for drainage of fluid compressed by the piston and leaking past the face end portion of the piston into the region of the junction of the abutment shoulder, and the end of the piston sleeve bearing thereagainst.

5. Piston construction according to claim 1 including, a piston rod (17) having an at least partly spherical head bearing against said bearing cup (6).

6. Piston construction according to claim 3 including, a piston rod (17) having an at least partly spherical head bearing against said bearing cup (6).

* * * * *

UNITED STATES PATENT AND TRADEMARK OFFICE

CERTIFICATE OF CORRECTION

PATENT NO. : 3,930,437

DATED : Jan. 6, 1976

INVENTOR(S) : Karl GUNTERT

It is certified that error appears in the above-identified patent and that said Letters Patent are hereby corrected as shown below:

Line 30 should read: " Foreign Application Priority Data
Mar. 20, 1973 Switzerland ...4054/73"

Signed and Sealed this

*sixth* Day of *April 1976*

[SEAL]

*Attest:*

RUTH C. MASON
*Attesting Officer*

C. MARSHALL DANN
*Commissioner of Patents and Trademarks*